June 25, 1963  J. C. CASANAVE  3,094,755
ROPE AND CONNECTOR ASSEMBLY
Filed Sept. 5, 1961
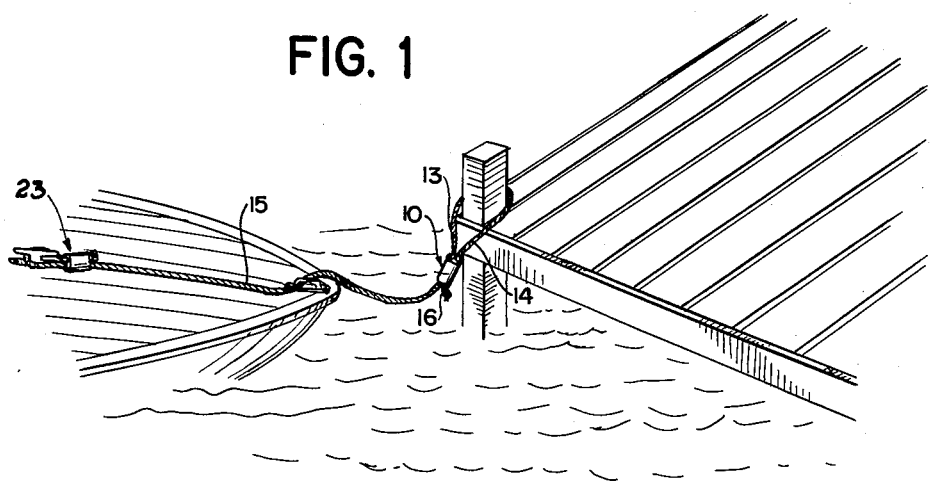
FIG. 1
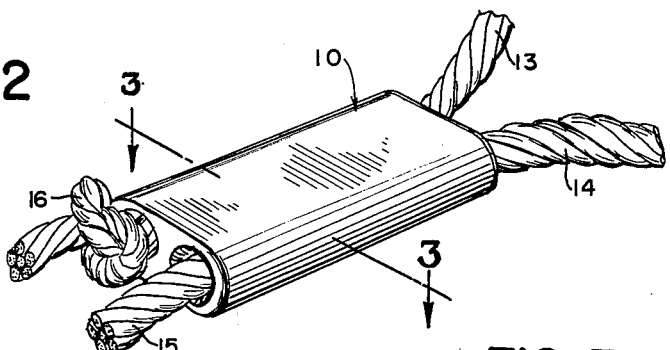
FIG. 2
FIG. 4
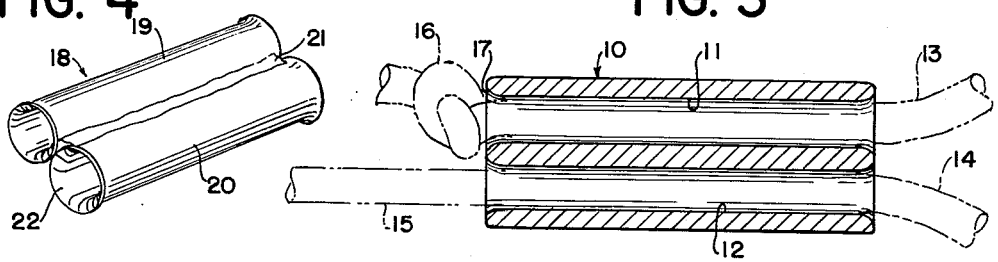
FIG. 3
FIG. 5
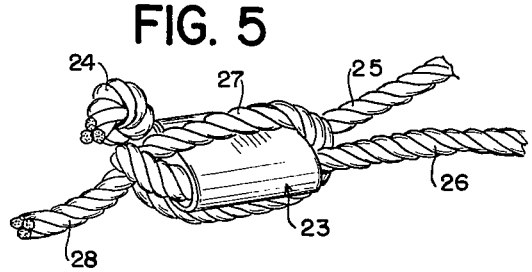
INVENTOR.
JEAN C. CASANAVE
BY
Mandeville & Schweitzer
ATTORNEYS

United States Patent Office 3,094,755
Patented June 25, 1963

3,094,755
ROPE AND CONNECTOR ASSEMBLY
Jean C. Casanave, New York, N.Y., assignor to Aldersvil Corp., a corporation of New York
Filed Sept. 5, 1961, Ser. No. 135,862
1 Claim. (Cl. 24—129)

The present invention relates to a rope and connector assembly, and more particularly to a novel and improved connector device enabling knotting, splicing, or like connection of ropes to be carried out with great speed and facility. The assembly of the invention is particularly useful for, but not necessarily limited to, making rope connections for securing boats, for example.

In accordance with the present invention, a novel and improved connector device is provided which is adapted to receive a pair of rope sections, which may be separate lengths of rope or separate sections of the same rope length, in a manner enabling the rope sections to be connected in a reliable and secure fashion using a simple, easily performed knot, such as an overhand knot, for example. In this respect, the splicing or securing of ropes, particularly in connection with the mooring of boats, for example, frequently involves the use of special knot formations which are difficult for a novice to prepare and may be substantially time consuming even for an experienced person. The device of the present invention enables a connection to be made in a fully reliable manner and with great speed and facility, using only the simplest form of knot, such as an overhand knot. Moreover, certain types of ropes, such as nylon core braided ropes, frequently used on sailboats and the like, are incapable of being spliced, at least by conventional techniques, and the assembly of the present invention is particularly useful in making splice or other connections of such ropes.

As a specific aspect of the invention, a novel rope connector is provided which comprises an elongated, rigid, non-deformable connector body having parallel passages therein for receiving separate rope sections. The passages through the connector body have a diameter sufficiently greater than that of the rope to be accommodated to permit the rope sections to slide freely through the passages. In addition, to avoid binding of the rope sections, the passages are arranged in closely spaced relation and are substantially greater in length than in diameter. A wide variety of rope connections can be made using the new connector, by sliding the rope sections through the respective passages in the connector body and knotting at least one of the rope sections to form an enlargement in the rope, of a size too large to travel through the passage.

For a better understanding of the invention, reference should be made to the following detailed description and to the accompanying drawing, in which:

FIG. 1 is a perspective view illustrating a typical advantageous use of the rope and connector assembly of the invention for securing a boat to a dock;

FIG. 2 is an enlarged perspective view illustrating one advantageous form of the new rope and connector assembly;

FIG. 3 is a longitudinal cross-sectional view of the rope and connector assembly of FIG. 2, taken generally along line 3—3 of FIG. 2;

FIG. 4 is a perspective view of a modified form of the new connector assembly; and FIG. 5 is a perspective view illustrating a second advantageous manner of using the new rope and connector assembly.

Referring now to the drawing, and initially to FIGS. 1–3 thereof, the reference numeral 10 designates generally the body of the new connector device. In accordance with one of the specific aspects of the invention, the connector body 10 is of elongated form and is provided with parallel passages 11, 12 extending lengthwise. The passages 11, 12 are of substantially greater length than diameter and are spaced relatively close together, sufficient spacing being provided, however, to accommodate the formation of a simple knot, such as an overhand knot, in a rope section received in one of the passages. The diameter of the passages is calculated to be such as to receive freely sections 13, 14 of a rope of predetermined diameter. Thus, the connector device for a rope of predetermined diameter will have passages 11, 12 of a predetermined, slightly larger diameter.

To prevent binding of the rope sections in the passages, the separation of the passages should be kept to a practical minimum, and the length of the passages should be substantial in relation to their diameter. Of course, considerable variation in specific design may be accommodated, since the effect of increasing the spacing between passages may be offset by increasing the length of the passages relative to their diameter. In a typical, advantageous form of the invention, for use with rope sections of 3/8 inch diameter, the diameter of the passages may be about 7/16 inch to 1/2 inch, and the length of the passages may be on the order of 3/4 inch to 1 inch or more. The spacing between the passages may be about 1/8 inch to 1/4 inch.

In the specific illustration of FIGS. 1–3, the rope and connector assembly is shown to be used in forming a simple loop in a single length of rope, such an arrangement being particularly convenient in the securing of a boat, for example. To this end, a length of rope 15 is passed through the passage 12, formed into a loop, and returned through the passage 11 such that separate sections 13, 14 of the single length of rope 15 are received in the respective connector passages. The free end portion of the rope, constituting an extension of the rope section 13, is knotted in a simple and expedient fashion, such as to form an overhand knot 16, for example. The knot 16, being substantially larger than the passage 11, cannot travel through the passage, but simply abuts against the end surface 17 of the connector body when tension is applied to the rope. The connection thus made is wholly reliable, since the application of increasing tension to the rope connection simply causes the knot 16 to be tightened further by the pressure on the end surface 17.

To avoid chafing of the knot 16, the end portion of the passage 11, against which the knot bears, advantageously is flared outward to provide a smooth, rounded surface to act against the enlarged, knotted portion of the rope. For the specific application illustrated in FIGS. 1–3, only the end surface 17 is required to be flared outward. However, it is advantageous to provide a similar outward flaring at both ends of each passage, so that the connector body may be applied to the rope without regard to its orientation. Further, substantial outward flaring of the passage ends reduces the likelihood of chafing of the rope sections themselves, due to sliding movements of the rope relative to the connector body.

Advantageously, the connector body 10 is of single piece, molded construction. Nylon or like plastic material is a particularly desirable material of construction in view of its inherent strength, durability, resistance to corrosion, and lightness in weight. For outdoor application, materials such as aluminum, copper, or bronze are also very suitable because of their resistance to corrosion, although they are less advantageous than nylon or like plastic for certain applications, in view of their greater cost and/or weight.

In the modified form of the invention shown in FIG. 4, the connector body 18 of extremely simplified form is comprised of a pair of tubular sections 19, 20 secured together in side-by-side relation to have a figure-eight shaped profile by soldering or brazing, as indicated at 21. Advantageously, the tubular sections 19, 20 are formed of sections of copper tubing, for example, flared outwardly at the ends as indicated at 22.

In accordance with the previously described principles of the invention, the tubular sections 19, 20 are secured together as closely as practicable and have a length substantially greater than their diameter. The internal diameter of the tubular sections is greater by a predetermined, relatively small amount than the diameter of the rope to be accommodated so that the rope sections will slide freely through the tubular passages.

In the modified form of the invention shown in FIG. 5, the new connector element, designated generally by the reference numeral 23, is somewhat shorter in length than the previously described embodiments, although still of substantially greater length than the diameter of the tubular passages therethrough. The illustration of FIG. 5 shows a further advantageous manner of utilizing the new connector to form a fixed loop, rather than a sliding loop such as shown in FIG. 1.

To form a fixed loop, one section 25 of a rope length is inserted through a connector passage and provided with a simple knot 24. A second rope section 26 is inserted through the other connector passage to form a loop, and the size of the loop is set by slidable adjustment of the free end 28 of the rope. The loop is then fixed by passing the free end 28 of the rope over the connector, through the loop, back along the other side of the connector, and then between the connector body and rope to form a knot 27, all as shown in FIG. 5. The crotch portions between the tubular sections 19 and 20 of the figure-eight shaped connector shown in FIG. 5 are especially advantageous in supporting rope portions when such connector is used in the formation of a knot similar to the knot 27 described hereinabove.

The new rope and connector assembly, although extremely simplified in design, is capable of a wide variety of advantageous uses. Thus, in addition to the arrangements shown in FIGS. 1–5, the assembly may be employed to effect easy and rapid splicing of two lengths of rope. The last-mentioned use is of particular advantage with respect to certain popular rope forms widely used in sailing, for example, which are incapable of being spliced in the usual manner.

Numerous additional applications will occur readily to those skilled in the art.

In its most advantageous form, the connector element is molded of a lightweight, durable material such as nylon or like plastic material, although lightweight, corrosion resistant metal materials are also desirable and advantageous for many applications.

In any of its forms, the connector element of the invention may be manufactured and sold at such low cost as to make its widespread use feasible and attractive.

It should be understood that the specific forms of the invention herein illustrated and described are intended to be representative only, as certain variations may be made therein without departing from the clear teachings of the disclosure. Accordingly, reference should be made to the following appended claim in determining the full scope of the invention.

What is claimed is:

A rope connector adapted for repeated use comprising a rigid, substantially non-deformable connector body having spaced, substantially cylindrical, tubular sections of equal length and intermediate portions joining said tubular sections along the longitudinal portions thereof, said intermediate portions having a width less than the outside diameter of said tubular sections, each of said tubular sections defining internal passageways, said body having a tapered portion at each end thereof, said tubular sections and said passageways being parallel and thereby giving said connector body a figure-eight shaped profile, whereby said connector is adapted to support sections of rope internally in said passageways, and is adapted to support sections of rope externally along the intermediate portions of said connector body between the outer walls of said tubular sections in crotch portions of said figure-eight shaped connector body.

References Cited in the file of this patent

UNITED STATES PATENTS

| 532,242 | McShane | Jan. 8, 1895 |
| 1,206,008 | McCabe | Nov. 28, 1916 |
| 3,034,469 | Allen | May 15, 1962 |

FOREIGN PATENTS

| 151,776 | Switzerland | Mar. 16, 1932 |